United States Patent Office 3,351,481
Patented Nov. 7, 1967

3,351,481
PROCESS OF PRODUCING PHTHALOCYANINE PIGMENTS
Arthur P. Hopmeier, Upper Saddle River, and John W. Ingram, Cranford, N.J., assignors to Sun Chemical Corporation, New York, N.Y., a corporation of Delaware
No Drawing. Filed Oct. 12, 1964, Ser. No. 403,372
13 Claims. (Cl. 106—288)

This invention relates to the preparation of improved phthalocyanine pigments and more particularly to a novel process for the preparation of metal phthalocyanines and their chlorinated derivatives in a finely divided solid state characterized by possessing high tinctorial strength and tinctorial stability when incorporated into vehicles containing aromatic liquids.

Tinctorial strength is an extremely important factor in the manufacture of pigments including phthalocyanine pigments. It is well recognized in the pigment art that tinctorial strength is dependent on the crystal size of the pigment and it increases as the size of the pigment crystals decreases.

In view of the relationship between tinctorial strength and particle size, the commercially acceptable phthalocyanine pigments must have a particle size in the order of a fraction of a micron. Heretofore, according to customary practices, there were many and varied methods of reducing the particle size of metal phthalocyanine pigments in order to obtain commercially acceptable products. The various processes included acid pasting and salt milling with a wide variety of grinding aids and various organic solvents. However, the prior art processes suffered from many disadvantages including the lack of stability and poor tinctorial strength of the finished pigment as well as the use of elaborate and expensive processing techniques.

The problem of arriving at commercially acceptable phthalocyanine pigments of high tinctorial strength is complicated by the fact that metal phthalocyanines, in particular, copper phthalocyanine, exist in two crystalline forms which have been designated in the art as the alpha and beta modifications. Descriptions of the two crystalline modifications and their influence on the physical and tinctorial properties of copper phthalocyanine may be found in FIAT Final Report No. 1313, PB No. 85, 172, vol. 3, pages 446–448. The terminology used herein in referring to the alpha and beta crystal forms of the metal phthalocyanines is in accordance with the above FIAT report.

At ordinary temperatures the beta modification of copper phthalocyanine is more stable than the alpha form. It is known in the art that the alpha crystal is transformed spontaneously into the beta crystal when it is heated at temperatures exceeding 200° C. Additionally and perhaps more significantly it is also known that when the alpha form is contacted with a wide variety of organic liquids, it is transformed to the beta form. Although copper phthalocyanine is considered insoluble in organic liquids, nevertheless many liquids have a sufficient solvent action on the alpha crystal to produce a solution saturated with respect to the beta form. The effect of this is to continuously dissolve the alpha form and transform it to crystals of the beta form until substantially the entire pigment has been transformed.

One serious consequence of the transformation of the alpha crystal to the beta crystal in the presence of organic solvents is the fact that the beta crystals tend to grow in size during the transformation. As has been previously pointed out, the crystal size of the pigment is inversely dependent on its tinctorial strength. The tendency of the alpha crystal to revert to the beta crystal in the presence of organic solvents is tremendously disadvantageous from a practical point of view since most surface coating compositions in which the pigments are employed use organic liquids as thinners or diluents so that these coating compositions are relatively unstable. It should be pointed out that the alpha and beta modifications of copper phthalocyanine have their own individual color, the alpha modification being reddish-blue and the beta modification being a greenish-blue. Therefore, the transition from the alpha to the beta modification is now desirable in applications where particular colors are wanted, such as in printing inks and paints.

From the above discussion, it can be seen that for many applications the preferred form of copper phthalocyanine pigments is the beta modification since this modification is more stable in the various commercial applications of the pigment. It is to be understood, however, that the alpha modification is far from being valueless in the pigment art and, in fact, the process of this invention allows for the production of either the alpha modification or the beta modification, both forms being of high tinctorial strength.

Therefore, it is the primary object of this invention to produce a phthalocyanine pigment of high tinctorial strength and of other good qualities which make it particularly useful for incorporation into liquid coating compositions such as paints, lacquers and printing inks.

It is still another object of this invention to provide a novel process for the production of phthalocyanine pigments, said pigments being characterized by extremely high stability towards aromatic solvents and ease of manufacture.

Still another object of this invention is to produce a phthalocyanine pigment which may be incorporated into coating compositions and stored for long periods of time without exhibiting any change in shade or strength.

The process of this invention is carried out by treating a metal phthalocyanine or its chlorinated derivative with anhydrous sodium sulfate as a grinding aid and with a sufficient quantity of an organic solvent selected from the group consisting of morpholine, dimethyl sulfoxide, polyglycolamines and mixtures thereof, so as to form a pasty or doughy mixture, and then subjecting said doughy or pasty mixture to an intensive mixing and shearing action.

Although salt milling of metal phthalocyanine is well known in the art, the selected milling aid should be one which is water-soluble, so as to facilitate its removal from the pigment by water-washing, and should be of a fine particle size. Milling aids which may be employed are sodium chloride, sodium carbonate, potassium sulfate, sodium sulfate, and other salts of a fine crystalline size, with the preferred salt being anhydrous sodium sulfate.

The use of morpholine, dimethyl sulfoxide, polyglycolamines, i.e., diglycolamines and mixtures thereof, as the organic medium has several advantages over the solvents employed in the prior art processes. The majority of solvents heretofore employed were insoluble in water thereby requiring removal by distillation or treating with acids.

Unfortunately, when the acid was employed, it attacked the milling equipment, thereby necessitating the removal of the pasty mass prior to applying the acid. In practice, the removal of the pasty mass from the milling equipment involves difficult and costly procedures. In the instant process, the use of morpholine, dimethyl sulfoxide, polyglycolamines and mixtures thereof as the organic medium allows for the treatment of the reaction mixture with water thereby eliminating the need for solvent distillation or treatment with acid.

Another advantage of the instant process which employs anhydrous sodium sulfate, morpholine, dimethyl sulfoxide, polyglycolamines and mixtures thereof, is the fact that crude metal phthalocyanine or its chlorinated derivatives can be employed as starting materials. Most of the heretofore practiced procedures involved the necessity of purifying the starting material in order to obtain pigments which were of commercially acceptable quality. It is to be understood, however, that purified metal phthalocyanines are also operable in the process of this invention and it is intended to include the use of metal phthalocyanines in the crude beta form, in the purified beta form, in the acid pasted alpha form or any combination of these materials or their chlorinated derivatives as starting materials in the instant process.

In another embodiment of this invention, it is possible to produce a metal phthalocyanine pigment of high tinctorial strength but having crystals of the alpha modification. In this embodiment, an acid pasted alpha metal phthalocyanine or its chlorinated derivative is treated with anhydrous sodium sulfate and a sufficient amount of a mixture of organic solvents where one of the solvents is morpholine and then the entire mixture is subjected to intensive mixing and shearing forces. It has been discovered that when a mixture of organic solvents containing morpholine is substituted for other organic solvents, such as aniline or cresol in salt milling alpha copper phthalocyanine, the resulting pigment remains principally in the alpha form but exhibits a high degree of stability to organic solvents.

As has heretofore been pointed out, the process of this invention resides in subjecting a metal phthalocyanine or its chlorinated derivatives to salt milling in the presence of anhydrous sodium sulfate and an organic solvent. The amount of sodium sulfate employed is not narrowly critical and can vary over a wide range. However, it has been found that from 2 to 10 parts by weight of anhydrous sodium sulfate per part of metal phthalocyanine is particularly advantageous.

Temperature, as part of the process of this invention, is a factor. It has been discovered that dimethyl sulfoxide, polyglycolamines and mixtures thereof are crystallizing solvents and elevation of temperature increases their effectiveness as crystallizing solvents.

It has also been discovered that at low temperatures the crystallizing effect of dimethyl sulfoxide, polyglycolamines and mixtures thereof is offset by the tendency of salt grinding to convert the beta crystalline form to the alpha crystalline form. Beta crystalline material remains principally beta and alpha crystalline material principally alpha. At elevated temperatures the crystallizing effect of dimethyl sulfoxide, polyglycolamines and mixtures thereof becomes the dominant force and conversion to the beta form takes place when alpha crystalline material is used.

The amount of organic solvent employed is also not narrowly critical and can vary over a wide range. However, our investigations have shown that from 0.4 to 1.5 parts by weight of solvent per part of metal phthalocyanine or its chlorinated derivatives is particularly advantageous.

When the solvent employed is morpholine, it is preferred that the morpholine be from 5 to 15 percent by weight of the mixture with the preferred range being from about 7 to 10 percent by weight of the mixture.

The process of the invention is carried out by subjecting a paste comprising a metal phthalocyanine or a chlorinated derivative thereof, anhydrous sodium sulphate and an organic solvent to an intensive shearing and mixing action. The length of time that intensive shearing and mixing action is employed is not narrowly critical and it has been ascertained that from 2 to 10 hours, preferably from 3 to 7 hours, of mixing are adequate in the ordinary case.

The extensive mixing and shearing action can be conveniently applied in conventional equipment which is well known in the art. Operable types of equipment which can be employed include heavy duty dispersers, heavy duty kneaders or heavy duty dough mixers.

The desired pigment in its finely divided form can be separated from the reaction mixture by conventional techniques. Generally when morpholine, dimethyl sulfoxide, polyglycolamines and mixtures thereof are employed as a solvent, the reaction mixture is treated with water to dissolve the soluble salt, filtered, washed and dried to yield the desired pigment.

The following examples will illustrate the novel process of this invention but it is to be understood that it is not intended to be limited thereto.

*Example I*

A mixture consisting of 363 grams of dry alpha crystalline type phthalocyanine blue (produced by phthalic anhydride, urea, copper sulfate and ammonium molybdate), 2540 grams of anhydrous sodium sulfate and a mixture of 189 grams of dimethyl sulfoxide and 19.8 grams of water are placed in a double-armed dispersion blade mixer and mixed until the conversion to the beta form ceases and for two hours thereafter at a temperature of about 125° C. At the end of the milling period, the reaction mixture is treated with enough water at 60° C. to dissolve the soluble salt. The entire solution is filtered and dried. The resulting pigment is stronger, cleaner and slightly greener than similar beta type materials made heretofore.

*Example II*

To a double-armed dispersion blade mixer, there is charged 363 grams of commercial grade crude phthalocyanine blue in beta form, 2540 grams of sodium sulfate in fine crystalline form, and 218 grams of dimethyl sulfoxide. The mass is mixed for from three to four hours at a temperature below 60° C., then immersed in water at 60° C. with agitation. The resulting solution is filtered, washed and dried. The resulting product, which is stronger, cleaner and slightly greener than beta type materials heretofore prepared, is substantially the same as the product obtained in Example I.

*Example III*

A mixture consisting of 40 kilograms of unpurified crude phthalocyanine blue (suitably produced from phthalic anhydride, urea, copper sulfate and sodium molybdate by known methods) 225 kilograms of anhydrous sodium sulfate and 12 kilograms of dimethyl sulfoxide are charged to a mixer and mixed until the optimum shade is produced. The time and temperature of mixing are not highly critical; longer time produces a stronger pigment while higher temperature produces greener but dirtier shades.

The product is boiled with a solution containing an excess of 1% sulfuric acid, filtered, washed, then boiled with a solution containing an excess of 1% caustic soda, filtered, washed free of alkali and dried.

*Example IV*

To a mixer provided with a jacket for cooling there is added 7,000 grams of anhydrous sodium sulfate, 540 grams of dimethyl sulfoxide and 60 grams of morpholine. To the mixture is then added 1,000 grams of acid pasted copper phthalocyanine in the alpha form. After milling at 25–40° C. until the maximum strength is attained, about 4 hours, the product was purified in accordance with Example I. The resulting color is a very strong blue pigment possessing outstanding jetness of masstone and characterized by having a red shade. The pigment exhibited a high degree of stability to organic solvents.

*Example V*

The process of Example I was repeated with the exception that a portion of the alpha phthalocyanine is replaced by 36 grams of an acid pasted monochloro phthalocyanine in the alpha form. The product obtained by the procedure in Example I is equal in all respects to that obtained in Example I with the exception that the product is of a slightly greener shade.

Example VI

To a double-armed dispersion blade mixer, there is charged 350 grams of dry alpha crystalline type phthalocyanine blue, 2430 grams of a very fine crystalline form of anhydrous sodium sulfate, and 125 grams of diglycolamine. The temperature is raised to 125° C., or that temperature necessary to bring about conversion to the beta form. This temperature is maintained until the conversion to the beta form is complete and for two hours thereafter. The maintenance of high attrition is essential to the accomplishment of the desired result in a reasonable time and this has been found in a high degree dependent on the amount of solvent present. Because of this, additional diglycolamine may be needed to replace that lost through evaporation. At the end of the milling, the mass is treated with enoungh water at 60° C. to dissolve the soluble salt. The resulting solution is filtered and the solids retained thereon dried. The product obtained exhibited a stronger, cleaner and a higher tinctorial strength than similar beta type materials prepared heretofore.

Example VII

The process of Example II was repeated with the exception that diglycolamine is used in place of dimethyl sulfoxide. The product obtained is substantially equal to the product obtained from Example VI.

Example VIII

The process of Example II was repeated with the exception that morpholine is used in place of dimethyl sulfoxide. The product obtained is a very strong blue with outstanding jetness and cleanness characterized by having a red shade. It also exhibited a high degree of stability to organic solvents.

Example IX

The process of Example IV was repeated with the exception that diglycolamine is used in place of dimethyl sulfoxide. The product obtained is of high tinctorial strength and comparable to that obtained in Example IV.

The anhydrous sodium sulfate used in the above examples had a surface area of approximately 0.0082 square meter per gram.

It is to be understood that many modifications and variations in the above examples will appear to those skilled in the art and it is not intended that this invention be limited except as necessitated by the appended claims.

What is claimed is:

1. A process which comprises subjecting a mixture consisting of a metal phthalocyanine, from 2 to 10 parts of an inorganic salt of a fine crystalline size, and from 0.4 to 1.5 parts of a solvent selected from the group consisting of morpholine, dimethylsulfoxide, polyglycolamines and mixtures thereof, to intensive mixing and shearing at a temperature of from 25–150° C. for a period of time of from 2 to 10 hours, said parts being parts by weight per part of metal phthalocyanine, and removing said inorganic salt and said solvent from said mixture.

2. The process of claim 1 wherein the metal phthalocyanine is a copper phthalocyanine.

3. The process of claim 1 wherein the metal phthalocyanine is a chlorinated derivative of copper phthalocyanine.

4. The process of claim 1 wherein the metal phthalocyanine is purified phthalocyanine blue.

5. The process of claim 1 wherein the metal phthalocyanine is crude phthalocyanine blue.

6. The process of claim 1 wherein the solvent used is dimethyl sulfoxide.

7. The process of claim 1 wherein the solvent used is a polyglycolamine.

8. The process of claim 1 wherein the solvent used is a mixture of polyglycolamines.

9. The process of claim 1 wherein the solvent is a mixture containing morpholine as one of the solvent components.

10. The process of claim 1 wherein the metal phthalocyanine is in the alpha crystalline form.

11. The process of claim 1 wherein the metal phthalocyanine is in the beta crystalline form.

12. The process of claim 1 wherein the solvent is diglycolamine,

13. The process of claim 1 wherein the inorganic salt is anhydrous sodium sulfate.

References Cited

UNITED STATES PATENTS

| 3,160,510 | 12/1964 | Ehrich | 106—288 |
| 3,030,370 | 4/1962 | Jackson | 106—288 |

FOREIGN PATENTS

| 882,986 | 11/1961 | Great Britain. |
| 761,308 | 11/1956 | Great Britain. |
| 930,150 | 7/1963 | Great Britain. |

TOBIAS E. LEVOW, *Primary Examiner.*

HELEN M. McCARTHY, *Examiner.*

J. E. POER, *Assistant Examiner.*